(12) United States Patent
Li

(10) Patent No.: US 12,229,182 B2
(45) Date of Patent: Feb. 18, 2025

(54) IMAGE-BASED SEARCH METHOD, SERVER, TERMINAL, AND MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventor: Yaoqiang Li, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 146 days.

(21) Appl. No.: 17/598,856

(22) PCT Filed: Mar. 25, 2020

(86) PCT No.: PCT/CN2020/081121
§ 371 (c)(1),
(2) Date: Sep. 27, 2021

(87) PCT Pub. No.: WO2020/192691
PCT Pub. Date: Oct. 1, 2020

(65) Prior Publication Data
US 2022/0197939 A1    Jun. 23, 2022

(30) Foreign Application Priority Data

Mar. 28, 2019 (CN) .......................... 201910242279.7

(51) Int. Cl.
*G06F 16/53* (2019.01)
*G06V 10/74* (2022.01)

(52) U.S. Cl.
CPC ............ *G06F 16/53* (2019.01); *G06V 10/761* (2022.01)

(58) Field of Classification Search
CPC ...... G06F 16/53; G06F 16/532; G06F 16/538; G06F 16/5866; G06F 16/583; G06V 10/761
See application file for complete search history.

(56) References Cited

U.S. PATENT DOCUMENTS 7,356,486 B2 * 4/2008 Sullivan ............... G07G 1/0036
705/16
8,352,465 B1    1/2013 Jing et al.
(Continued)

FOREIGN PATENT DOCUMENTS

| CN | 101419612 A | 4/2009 |
|---|---|---|
| CN | 103345645 A | 10/2013 |

(Continued)

OTHER PUBLICATIONS

European Extended Search Report dated Jan. 2, 2023 of European Application No. 20776656.9.
(Continued)

*Primary Examiner* — Angelica Ruiz
(74) *Attorney, Agent, or Firm* — Qinghong Xu

(57) ABSTRACT

The present disclosure provides an image-based search method, which is applied to a server. Said method comprises: according to image content in an image to be searched, extracting a target set from an index library; according to the attribute of each target in the target set, determining the number of targets corresponding to the attribute of each target; and according to the number of targets corresponding to the attribute of each target, sending a display target and the attribute of the display target to a terminal.

22 Claims, 20 Drawing Sheets

(56) References Cited

U.S. PATENT DOCUMENTS

| | | | |
|---|---|---|---|
| 8,949,253 B1 | 2/2015 | Jing et al. | |
| 2008/0064371 A1* | 3/2008 | Madhavapeddi | G06Q 30/0241 704/270.1 |
| 2008/0167106 A1* | 7/2008 | Lutnick | G07F 17/32 463/16 |
| 2010/0153449 A1* | 6/2010 | Baba | G06F 16/583 707/E17.03 |
| 2010/0211431 A1* | 8/2010 | Lutnick | G06Q 30/0255 705/14.1 |
| 2010/0222041 A1* | 9/2010 | Dragt | G06Q 30/02 455/414.2 |
| 2010/0312639 A1* | 12/2010 | Mastronardi | G06Q 30/0251 705/14.48 |
| 2010/0324977 A1* | 12/2010 | Dragt | G06Q 30/02 705/14.62 |
| 2011/0314031 A1* | 12/2011 | Chittar | G06F 16/5854 707/E17.019 |
| 2012/0197981 A1* | 8/2012 | Chan | G06Q 30/06 726/5 |
| 2012/0323695 A1* | 12/2012 | Stibel | G06Q 30/02 705/14.66 |
| 2013/0013427 A1 | 1/2013 | Gonsalves et al. | |
| 2013/0073388 A1* | 3/2013 | Heath | G06Q 50/01 705/14.53 |
| 2013/0325840 A1 | 12/2013 | Kritt et al. | |
| 2014/0188844 A1* | 7/2014 | Kogan | G06F 16/58 707/722 |
| 2015/0127438 A1* | 5/2015 | Wedderburn | G06Q 30/0214 705/14.16 |
| 2017/0026718 A1* | 1/2017 | Yabu | H04N 21/8358 |
| 2017/0109786 A1* | 4/2017 | Park | G06F 16/901 |
| 2017/0193011 A1 | 7/2017 | Kale et al. | |
| 2018/0108066 A1 | 4/2018 | Kale et al. | |
| 2020/0334287 A1* | 10/2020 | Xu | G06N 3/08 |
| 2021/0165818 A1* | 6/2021 | Matsushita | G06V 10/761 |

FOREIGN PATENT DOCUMENTS

| | | |
|---|---|---|
| CN | 103412937 A | 11/2013 |
| CN | 104142946 A | 11/2014 |
| CN | 106868792 A | 6/2017 |
| CN | 107145487 A | 9/2017 |
| CN | 107229741 A | 10/2017 |
| CN | 107918616 A | 4/2018 |
| CN | 108399174 A | 8/2018 |
| CN | 108664514 A | 10/2018 |

OTHER PUBLICATIONS

The International Search Report dated Jun. 23, 2020 for PCT International application No. PCT/CN2020/081121.
1st Office Action dated Mar. 21, 2024 for Chinese Application No. 201910242279.7.
2nd Office Action dated Oct. 31, 2024 of Chinese Application No. 201910242279.7.

* cited by examiner

IMAGE-BASED SEARCH METHOD, SERVER, TERMINAL, AND MEDIUM

The present disclosure is based upon International Application No. PCT/CN2020/081121, filed on Mar. 25, 2020, which claims the priority to the Chinese Patent Application No. 201910242279.7, entitled "IMAGE-BASED SEARCH METHOD, SERVER, TERMINAL, AND MEDIUM", filed on Mar. 28, 2019.

TECHNICAL FIELD

The present disclosure relates to the technical field of the Internet, and in particular to an image-based search method, server, terminal and medium.

BACKGROUND

With the gradual popularization of smart devices and the application of machine learning methods represented by deep neural networks in the field of image retrieval, the application of image search technology on the Internet has become more and more widespread. Especially in the field of e-commerce, the rise of image search technology has successfully solved problems difficult to be solved by traditional text search. For example, when it is difficult for users to describe items they want to buy in words, they only need to upload a picture of the item, and the search engine can easily, accurately and quickly recall the commodity that the user wants to buy from the mass of commodities based on the image search technology, thereby significantly improving the user's shopping experience.

However, in the process of implementing the inventive concept of the present invention, the inventor found that the prior art has at least the following problems: in related technologies, when the image search engine performs the recall in the index library based on the image content, there may be many targets similar to the image content in the recalled result, so users need to screen out the content they want to browse from a large number of targets. For example, when the image search engine performs the recall in the index library based on the image content of the image of the commodity, the recalled similar commodity set may include commodities of multiple styles, multiple brands, or multiple promotional types at the same time. In this case, users can only screen out the most desired or worth buying commodities by browsing. This may require turning several pages or even more than a dozen pages, spending much time and energy, and bringing users poor user experience, and affecting the total turnover of the commodity in the end.

SUMMARY

In view of this, the present disclosure provides an image-based search method, server, terminal, and medium.

The first aspect of the present disclosure provides an image-based search method, applied to a server, the method including: extracting a target set from an index library according to an image content in an image to be searched; determining the number of targets corresponding to an attribute of each target according to the attribute of each target in the target set; and sending a display target and an attribute of the display target to a terminal according to the number of targets corresponding to the attribute of each target.

According to embodiments of the present disclosure, extracting a target set from an index library according to an image content in an image to be searched includes: searching for targets similar to the image content from the index library according to the image content in the image to be searched; extracting the target set from the searched targets based on a principle of similarity.

According to embodiments of the present disclosure, determining the number of targets corresponding to an attribute of each target according to the attribute of each target in the target set includes: calculating the number of occurrences of the attribute of each target in the target set; determining the number of targets corresponding to the attribute of each target according to the number of occurrences of the attribute of each target in the target set.

According to embodiments of the present disclosure, sending a display target and an attribute of the display target to a terminal according to the number of targets corresponding to the attribute of each target includes: sorting the attribute of each target according to the number of targets corresponding to the attribute of each target; sending the display target and the attribute of the display target to the terminal according to the sorting result.

According to embodiments of the present disclosure, sending the display target and the attribute of the display target to the terminal according to the sorting result includes: selecting the target attribute displayed to the terminal from the sorting result according to the number of display positions of the terminal; sending the target attribute and the display target corresponding to the target attribute to the terminal according to the target attribute displayed to the terminal.

According to embodiments of the present disclosure, the method further includes: in the target set, when a target has a plurality of types of similar or identical promotional information, generating one type of promotional information based on the plurality of types of similar or identical promotional information.

According to embodiments of the present disclosure, after sending a display target and an attribute of the display target to a terminal according to the number of targets corresponding to the attribute of each target, the method further includes: sending a display target corresponding to the attribute of the display target designated by a user to the terminal, in response to an operation of the user designating the attribute of the display target.

The second aspect of the present disclosure provides an image-based search method, applied to a terminal, the method including: sending an image to be searched to a server, such that the server extracts a target set from an index library according to an image content in an image to be searched, determines the number of targets corresponding to an attribute of each target according to the attribute of each target in the target set, and sends a display target and an attribute of the display target to a terminal according to the number of targets corresponding to the attribute of each target, and receiving the display target and the attribute of the display target.

According to embodiments of the present disclosure, wherein after receiving the display target and the attribute of the display target, the method further includes: receiving an attribute of a display target designated by a user, such that the server responds to an operation of the user designating the attribute of the display target and sends the display target corresponding to the attribute of the display target designated by the user to the terminal; receiving the display target corresponding to the attribute of the display target designated by the user.

The third aspect of the present disclosure provides an image-based search apparatus, applied to a server, the apparatus including: an extracting module, configured to extract a target set from an index library according to an image content in an image to be searched; a determining module, configured to determine the number of targets corresponding to an attribute of each target according to the attribute of each target in the target set; and a first sending module, configured to send a display target and an attribute of the display target to a terminal according to the number of targets corresponding to the attribute of each target.

According to embodiments of the present disclosure, the extracting module includes: a search module, configured to search for targets similar to the image content from the index library according to the image content in the image to be searched; an extracting sub-module, configured to extract the target set from the searched targets based on a principle of similarity.

According to embodiments of the present disclosure, the determining module includes: a calculating module, configured to calculate the number of occurrences of the attribute of each target in the target set; a determining sub-module, configured to determine the number of targets corresponding to the attribute of each target according to the number of occurrences of the attribute of each target in the target set.

According to embodiments of the present disclosure, the first sending module includes: a sorting module, configured to sort the attribute of each target according to the number of targets corresponding to the attribute of each target; a first sending sub-module, configured to send the display target and the attribute of the display target to the terminal according to the sorting result.

According to embodiments of the present disclosure, the first sending sub-module includes: a selecting module, configured to select the target attribute displayed to the terminal from the sorting result according to the number of display positions of the terminal; a sub-module of the first sending sub-module, configured to send the target attribute and the display target corresponding to the target attribute to the terminal according to the target attribute displayed to the terminal.

According to embodiments of the present disclosure, the apparatus further includes: a generating module, configured to, in the target set, when a target has a plurality of types of similar or identical promotional information, generate one type of promotional information based on the plurality of types of similar or identical promotional information.

According to embodiments of the present disclosure, the apparatus further includes: a responding module, configured to send a display target corresponding to the attribute of the display target designated by a user to the terminal, in response to an operation of the user designating the attribute of the display target.

The fourth aspect of the present disclosure provides a terminal for searching for information, including: an image sending apparatus, configured to send an image to be searched to a server, such that the server extracts a target set from an index library according to an image content in an image to be searched, determines the number of targets corresponding to an attribute of each target according to the attribute of each target in the target set, and sends a display target and an attribute of the display target to a terminal according to the number of targets corresponding to the attribute of each target; a receiving apparatus, configured to receive the display target and the attribute of the display target; and a displaying apparatus, configured to display the display target and the attribute of the display target.

According to embodiments of the present disclosure, the terminal further includes: an input apparatus, configured to receive an attribute of a display target designated by a user and send the attribute of the display target designated by the user to the server, such that the server responds to an operation of the user designating the attribute of the display target and sends the display target corresponding to the attribute of the display target designated by the user to the terminal, wherein the receiving apparatus is further configured to receive the display target corresponding to the attribute of the display target designated by the user; wherein the display apparatus is further configured to display the display target corresponding to the attribute of the display target designated by the user.

According to embodiments of the present disclosure, the terminal further includes: an image acquiring apparatus, configured as an acquiring apparatus for acquiring an image to be searched.

According to embodiments of the present disclosure, the image acquiring apparatus includes a camera installed on the terminal.

According to embodiments of the present disclosure, the display apparatus and the input apparatus are integrated as a touch-sensitive display apparatus, and the touch-sensitive display apparatus is configured to display the display target and the attribute of the display target, and input the attribute of the display target designated by the user.

The fifth aspect of the present disclosure provides a server, including: one or more processors; and a storage device for storing one or more programs, wherein, the one or more programs enable one or more processors to execute the image-based search method according to the first aspect when executed by the one or more processors.

The sixth aspect of the present disclosure provides a computer-readable medium having executable instructions stored thereon, wherein the instructions enable a processor to execute the image-based search method according to the first aspect when executed by the processor.

The seventh aspect of the present disclosure provides a computer program including computer executable instructions. When the instructions are executed, they are used to implement the image-based search method described in the first aspect.

The eighth aspect of the present disclosure provides a terminal, including: one or more processors; and a storage device for storing one or more programs, wherein, the one or more programs enable one or more processors to execute the image-based search method according to the second aspect when executed by the one or more processors.

According to embodiments of the present disclosure, the terminal includes a camera configured to acquire an image to be searched.

According to embodiments of the present disclosure, the terminal further includes a touch-sensitive display configured to display the display target and the attribute of the display target, and input the attribute of the display target designated by the user.

The ninth aspect of the present disclosure provides a computer-readable medium having executable instructions stored thereon, wherein the instructions enable a processor to execute the image-based search method according to the second aspect when executed by the processor.

The tenth aspect of the present disclosure provides a computer program including computer executable instructions. When the instructions are executed, they are used to implement the image-based search method described in the second aspect.

It should be noted that the above general description and the following detailed description are merely exemplary and explanatory and should not be construed as limiting of the present disclosure.

DETAILED DESCRIPTION

Hereinafter, embodiments of the present disclosure will be described with reference to the drawings. However, it should be understood that these descriptions are only exemplary, and are not intended to limit the scope of the present disclosure. In addition, in the following description, descriptions of well-known structures and technologies are omitted to avoid unnecessarily obscuring the concept of the present disclosure.

The terms used here are only for describing specific embodiments, and are not intended to limit the present disclosure. The terms "including", "including", etc. used herein indicate the existence of the described features, steps, operations and/or components, but do not exclude the presence or addition of one or more other features, steps, operations or components.

All terms (including technical and scientific terms) used herein have the meanings commonly understood by those skilled in the art, unless otherwise defined. It should be noted that the terms used here should be interpreted as having meanings consistent with the context of this specification, and should not be interpreted in an idealized or overly rigid manner.

In the case of using an expression similar to "at least one of A. B and C, etc.", generally speaking, it should be interpreted according to the meaning of the expression commonly understood by those skilled in the art (for example, "a system having at least one of A, B and C" shall include, but not limited to, a system having A alone, a system having B alone, a system having C alone, a system having A and B, a system having A and C, a system having B and C, and/or a system having A, B, C, etc.). Those skilled in the art should also understand that any transitional conjunctions and/or phrases essentially representing two or more optional items, whether in the description, claims or drawings, should be understood to include the possibilities of one of the projects, one party of the projects, or two projects. For example, the phrase "A or B" should be understood to include the possibilities of "A" or "B", or "A and B."

Figure 1:
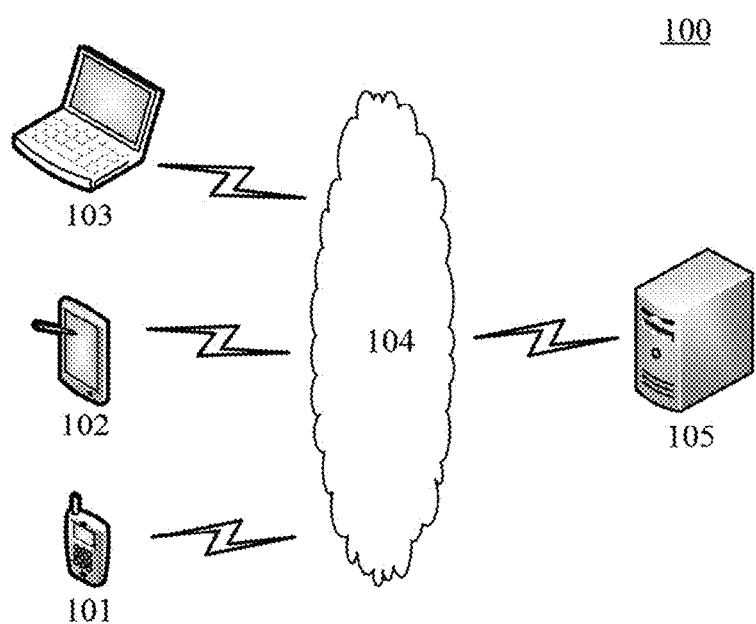
FIG. 1 shows a schematic diagram of an exemplary system architecture 100 of an image-based search method or an image-based search apparatus to which an embodiment of the present invention can be applied.

FIG. 1 shows a schematic diagram of an exemplary system architecture 100 of an image-based search method or an image-based search apparatus to which an embodiment of the present invention can be applied.

As shown in FIG. 1, the system architecture 100 may include one or more of terminal devices 101, 102, 103, a network 104 and a server 105. The network 104 is used to provide a medium for communication links between the terminal devices 101, 102, 103 and the server 105. The network 104 may include various connection types, such as wired, wireless communication links, or fiber optic cables, and so on.

It should be understood that the numbers of terminal devices, networks, and servers in FIG. 1 are merely illustrative. According to implementation needs, there can be any number of terminal devices, networks, and servers. For example, the server 105 may be a server cluster composed of multiple servers.

The user can use the terminal devices 101, 102, 103 to interact with the server 105 through the network 104 to receive or send messages. The terminal devices 101, 102, 103 may be various electronic devices with display screens, including but not limited to smart phones, tablet computers, portable computers, desktop computers, and so on.

The server 105 may be a server that provides various services. For example, the server 105 can obtain the image to be searched from the terminal device 103 (or the terminal device 101 or 102), and then can extract a target set from an index library according to an image content in an image to be searched; determine the number of targets corresponding to the attribute of each target according to the attribute of each target in the target set; and send a display target and the attribute of the display target to a terminal according to the number of targets corresponding to the attribute of each target, such that a user can quickly and accurately screen out a target that he/she wants to browse, thereby greatly improving the user experience.

In some embodiments, the image-based search method provided in the embodiment of the present invention is generally executed by the server 105. Accordingly, the image-based search apparatus is generally set in the server 105. In other embodiments, some terminals may have functions similar to those of a server to perform this method. Therefore, the image-based search method provided by the embodiment of the present invention is not limited to be executed on the server side.

Figure 2:
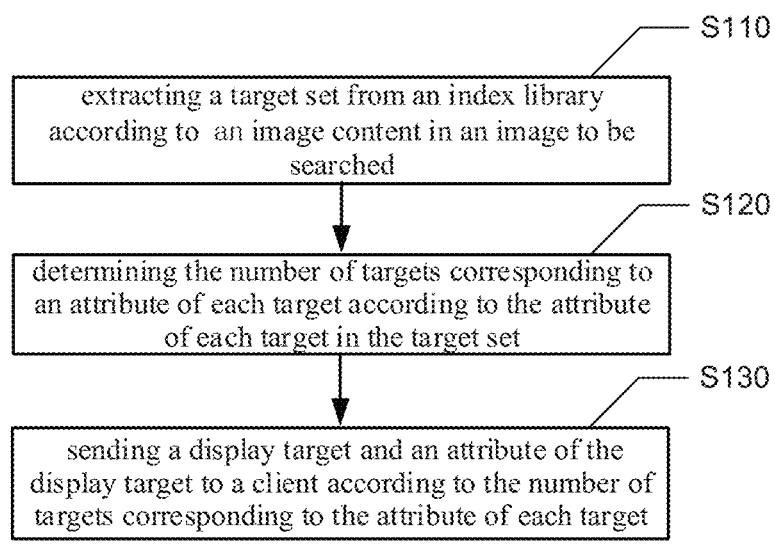
FIG. 2 schematically shows a flowchart of an image-based search method applied to a server according to an embodiment of the present disclosure.

FIG. 2 schematically shows a flowchart of an image-based search method applied to a server according to an embodiment of the present disclosure.

As shown in FIG. 2, the image-based search method applied to the server includes steps S110 to S130.

In step S110, a target set is extracted from an index library according to an image content in an image to be searched.

In step S120, the number of targets corresponding to an attribute of each target is determined according to the attribute of each target in the target set.

In step S130, a display target and an attribute of the display target is sent to a terminal according to the number of targets corresponding to the attribute of each target.

The method can extract a target set from an index library according to an image content in an image to be searched; determine the number of targets corresponding to the attribute of each target according to the attribute of each target in the target set; and send a display target and the attribute of the display target to a terminal according to the number of targets corresponding to the attribute of each target, such that a user can quickly and accurately screen out a target that he/she wants to browse, thereby greatly improving the user experience. For example, if the image to be searched is an image of a commodity, the method of the present disclosure helps users to quickly and accurately screen out the target commodity from a large number of recalled commodities, which greatly improves the user experience, and ultimately greatly increases the total transaction volume.

In some embodiments of the present disclosure, the aforementioned image to be searched may include, but not limited to, a commodity image, a character image, an animal image, and a building image. For example, the above-mentioned image to be searched is a commodity image, and the image content of the commodity image can be a commodity, a character, an animal, or a building, or it can also be the brand of the commodity, the color of the commodity, the shape of the commodity, and the third-level category of the commodity, the height of the character, the gender of the character, the age of the character, the type of animal, the color of the animal, the living environment of the animal, the shape of the building, the structure of the building, the name of the building, and so on.

In some embodiments of the present disclosure, taking the image to be searched as a commodity image as an example, the image content of the commodity image may be a commodity. In this example, a large number of targets can be searched out from the index library according to the image content of the commodity image, and the targets are similar to the image content. For example, the commodity is a mobile phone, and commodities similar to the mobile phone can be searched out from the index library according to the image content. In addition, when the image content of the image to be searched is an image content of a character image, an animal image, or a building image, the corresponding character, animal, building can be searched out from the index library based on the image content.

In some embodiments of the present disclosure, when the image content of the image to be searched is the brand, color, shape, and third-level category of the commodity, the targets that are similar or identical to the brand can be searched out from the index library according to the brand of the commodity. According to the color of the commodity, a target having a similar or the same color can be searched out from the index library according to the color of the commodity. According to the shape of the commodity, a target having similar or the same shape can be searched out from the index library according to the shape of the commodity. According to the third-level category of the commodity, a target having similar or the same third-level category can be searched out from the index library according to the third-level category of the commodity. In addition, since the implementation process of searching for a target from the index library based on other images to be searched is the same or similar to the implementation process based on the image to be searched as a commodity image, it will not be repeated here.

In some embodiments of the present disclosure, the above-mentioned target set may contain the content similar to the image content of the image to be searched. For example, the image content of the image to be searched is a commodity, and then the content contained in the target set is a commodity similar to the commodity. The image content of the image to be searched is a character, and then the content contained in the target set is a character similar to the character. The image content of the image to be searched is an animal, and then the content contained in the target set is an animal similar to the animal. The image content of the image to be searched is a building, and then the content contained in the target set is a building similar to the building.

In some embodiments of the present disclosure, the above-mentioned target set contains targets having similar image contents of the image to be searched. For example, the image to be searched is an image of a commodity, and then the image content of the commodity includes the brand of the commodity, the color of the commodity, the shape of the commodity, and the third-level category of the commodity. Based on the image content of the commodity, a large number of targets having similar image contents of the commodity can be searched out from the index library. Specifically, the image to be searched is an image of a mobile phone, and the image content of the mobile phone may be Huawei, white, rectangle, communication device, and so on. According to each image content of the mobile phone, mobile phones with similar image content can be searched out from the index library, and each search result can be used as the aforementioned mobile phone set, that is, the target set.

In some embodiments of the present disclosure, the attributes of each target are obtained by traversing each target in the above-mentioned target set. For example, the above-mentioned target set is a commodity set, and the attributes of each commodity can be obtained by traversing each commodity in the commodity set, for example, the attribute can be brand, third-level category, style, etc. Then the number of targets corresponding to the attributes of each target is determined according to the attributes of each target, so that the display target and the attributes of the display target can be sent to the terminal according to the number of targets corresponding to the attributes of each target, so that users can quickly and accurately screen out the targets they want to browse, which greatly improves user experience.

In some embodiments of the present disclosure, after the above step S130, the above method further includes: sending a display target corresponding to the attribute of the display target designated by a user to the terminal, in response to an operation of the user designating the attribute of the display target. In this way, targets designated by the user can be quickly screened out from the display target and the attributes of the display target in step S130, which further saves the time for screening for the user.

In some embodiments of the present disclosure, the attributes of the display target designated by the user may be generated based on the attributes of each target in the aforementioned target set, so as to realize recommending a display target corresponding to the attribute of the display target designated by a user to the terminal in response to an operation of the user designating the attribute of the display target.

Figure 3:
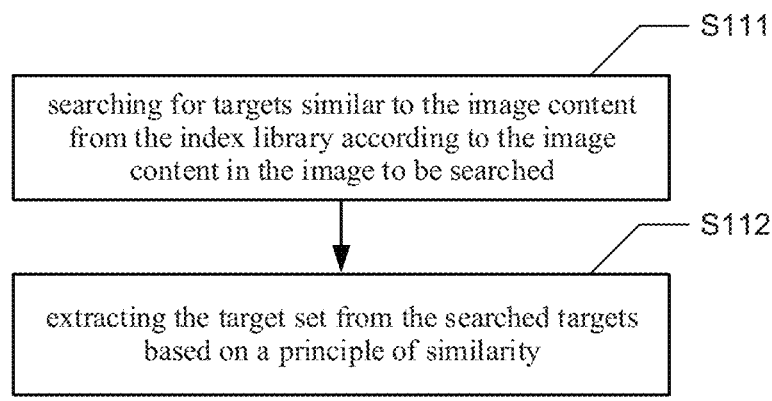
FIG. 3 schematically shows a flowchart of an image-based search method applied to a server according to another embodiment of the present disclosure.

FIG. 3 schematically shows a flowchart of an image-based search method applied to a server according to another embodiment of the present disclosure.

As shown in FIG. 3, the above step S110 may specifically include step S111 and step S112.

In step S111, targets similar to the image content are searched out from the index library according to the image content in the image to be searched.

In step S112, the target set is extracted from the searched targets based on a principle of similarity.

This method can search out targets similar to the image content from the index library according to the image content in the image to be searched, and then extract the target set from the searched targets based on the principle of similarity. In this way, targets that are similar to each image content are preliminarily extracted from the targets searched out according to each image content in the image to be searched, making it easier to count the number of targets corresponding to the attributes of each target subsequently.

In some embodiments of the present disclosure, taking the image to be searched as a commodity image as an example, the image content of the image attribute of the commodity image may be a commodity. For example, based on the commodity, 58 commodities that are similar to the commodity can be searched out from the index library. At this time, based on the principle of similarity, 20 commodities can be extracted from 58 commodities that are similar to the commodity and used as a commodity set, i.e., the above-mentioned target set. Determining the target set in this way makes it easier to count the number of targets corresponding to the attributes of each target subsequently. The number of targets extracted from the search result can be designated by the terminal in the request parameters.

In some embodiments of the present disclosure, taking the image to be searched as a commodity image as an example, the image content of the commodity image may also be the brand of the commodity, the color of the commodity, the shape of the commodity, the third-level category of the commodity, and so on. For example, 58 targets having the similar brand are searched out from the index library according to the brand of the commodity, 62 targets having the similar color are searched out from the index library according to the color of the commodity, 50 targets having the similar shape are searched out from the index library according to the shape of the commodity, 200 targets having the similar third-level category are searched out from the index library according to the third-level category of the commodity, at this time, the sum of the number of targets in each search result is 370. In this embodiment, based on the principle of similarity, targets that are similar to each image content may be preliminarily extracted from the targets searched out according to each image content in the image to be searched, and the extracted result is served as the target set. For example, based on the principle of similarity, 20 targets can be extracted from 58 targets having the similar brand, 26 targets can be extracted from 62 targets having the similar color, 15 targets can be extracted from 50 targets having the similar shape that are searched out from the index library, 30 targets can be extracted from 200 targets having the similar third-level category, and the the extracted result is used as the target set, that is, the target set includes 91 targets, so that it is easier to count the number of targets corresponding to the attributes of each target subsequently. The number of targets extracted from the search result can be designated by the terminal in the request parameter.

In some embodiments of the present disclosure, taking the image to be searched as a commodity image as an example, the image content of the commodity image may be the brand of the commodity, the color of the commodity, the shape of the commodity, the third-level category of the commodity, and so on. For example, 58 targets having the similar brand are searched out from the index library according to the brand of the commodity, 62 targets having the similar color are searched out from the index library according to the color of the commodity, 50 targets having the similar shape are searched out from the index library according to the shape of the commodity, 200 targets having the similar third-level category are searched out from the index library according to the third-level category of the commodity, at this time, the sum of the number of targets in each search result is 370. In this embodiment, based on the principle of similarity, targets that are similar to each image content may be preliminarily extracted from the targets searched out according to each image content in the image to be searched, and the extracted result is served as the target set. For example, based on the principle of similarity, 20 targets can be extracted from 58 targets having the similar brand, 26 targets can be extracted from 62 targets having the similar color, 15 targets can be extracted from 50 targets having the similar shape that are searched out from the index library, 30 targets can be extracted from 200 targets having the similar third-level category, and the the extracted result is used as the target set, that is, the target set includes 91 targets, so that it is easier to count the number of targets corresponding to the attributes of each target subsequently. The number of targets extracted from the search result can be designated by the terminal in the request parameter.

In some embodiments of the present disclosure, the above method further includes: in the target set, when a target has a plurality of types of similar or identical promotional information, generating one type of promotional information based on the plurality of types of similar or identical promotional information. For example, 26 targets are extracted from 62 targets having the similar color, and many targets among the 26 extracted targets contain promotional information. For example, the promotional information may be 50% off for purchase quantity of 10 or more, 70% off for purchase quantity of 100 or more, and 20% off for purchase quantity of 5 or more. Or the promotional information may be: if the total purchase amount reaches 100, 10 will be deducted; if the total purchase amount reaches 1000, 100 will be deducted; if the total purchase amount reaches 10000, 500 will be deducted; or the like. In this case, a kind of promotional information can be generated based on a variety of similar or identical promotional information. For example, the plurality of "if the total purchase amount reaches M, N will be deducted" is aggregated into "deduction from the total purchase amount", and the plurality of "N off for purchase quantity of M or more" is aggregated into "discount", or the like, which is convenient for users to watch.

Figure 4:
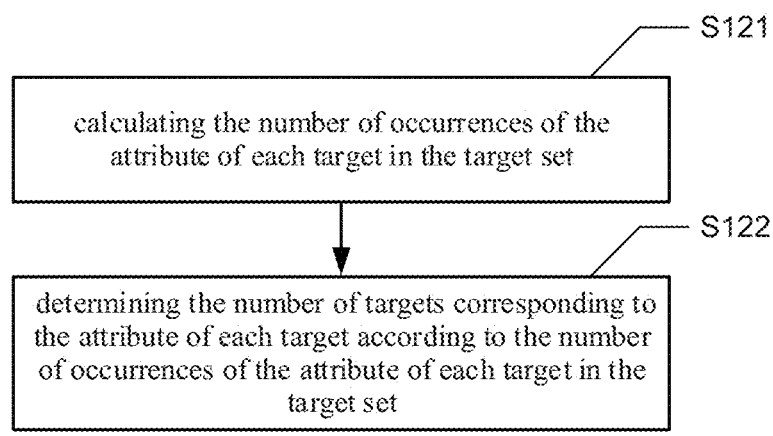
FIG. 4 schematically shows a flowchart of an image-based search method applied to a server according to another embodiment of the present disclosure.

FIG. 4 schematically shows a flowchart of an image-based search method applied to a server according to another embodiment of the present disclosure.

As shown in FIG. 4, the above step S120 may specifically include step S121 and step S122.

In step S121, the number of occurrences of the attribute of each target in the target set is calculated.

In step S122, the number of targets corresponding to the attribute of each target is determined according to the number of occurrences of the attribute of each target in the target set.

This method can determine the number of targets corresponding to the attribute of each target according to the number of occurrences of the attribute of each target in the target set, so that the display target and the attributes of the display target can be sent to the terminal according to the number of targets corresponding to the attributes of each target subsequently, which enables the user to quickly and accurately screen out the target that he/she wants to browse, and greatly improves the user experience.

In some embodiments of the present disclosure, taking the image to be searched as a commodity image as an example, the image content of the image attribute of the commodity image may be a commodity. For example, based on the commodity, 58 commodities that are similar to the commodity can be searched out from the index library. At this time, based on the principle of similarity, 20 commodities can be extracted from the 58 commodities that are similar to the commodity and used as a commodity set. The attribute values (for example, the attribute values can be brand ID, third-level category ID, style ID, etc.) of each commodity are obtained by traversing each commodity in the commodity set, and the number of occurrences of the brand ID, third-level category ID, style ID in the commodity set is calculated. Further, the number of commodities corresponding to the brand ID, third-level category ID, style ID is determined according to the number of occurrences of the brand ID, third-level category ID, style ID in the commodity set. Specifically, it is determined whether the brand ID, the third-level category ID, and the style ID have already appeared. If they do, the number of commodities corresponding to the attribute ID is added by 1, otherwise, the attribute ID is newly added and the corresponding number of commodities is set to 1. In this way, the number of commodities corresponding to the brand ID, third-level category ID, and style ID can be quickly determined.

In some embodiments of the present disclosure, taking the image to be searched as a commodity image as an example, the image content of the commodity image may be the brand of the commodity, the color of the commodity, the shape of the commodity, the third-level category of the commodity, and so on. For example, targets that are similar or the same as the brand can be searched out from the index library according to the brand of the commodity. At this time, the attribute value, such as the brand ID of the target, can be obtained from each target that is similar or the same as the brand. In this example, the number of occurrences of the brand ID of the target in the search result can be calculated by traversing the result searched out from the index library according to the brand of the commodity. Further, the number of targets corresponding to the brand ID of the target is determined according to the the number of occurrences of the brand ID of the target in the target set. Specifically, it is determined whether the brand ID has already appeared. If it does, the number of commodities corresponding to the attribute ID is added by 1, otherwise, the attribute ID is newly added and the corresponding number of commodities is set to 1. In this way, the number of targets corresponding to the brand ID of the target can be quickly determined.

Figure 5:
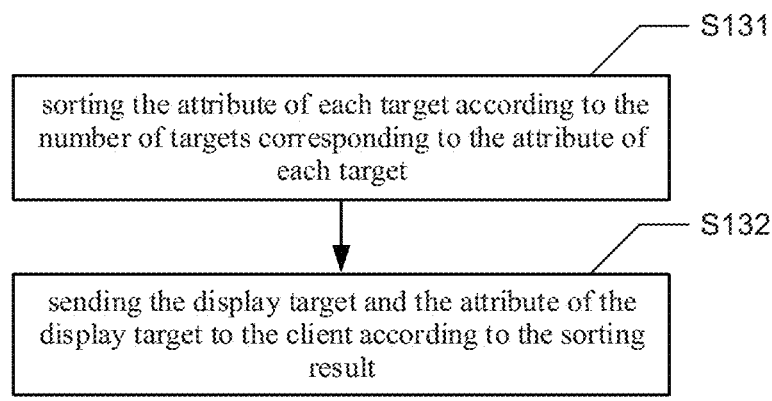
FIG. 5 schematically shows a flowchart of an image-based search method applied to a server according to another embodiment of the present disclosure.

FIG. 5 schematically shows a flowchart of an image-based search method applied to a server according to another embodiment of the present disclosure.

As shown in FIG. 5, the above step S130 may specifically include step S131 and step S132.

In step S131, the attribute of each target is sorted according to the number of targets corresponding to the attribute of each target.

In step S132, the display target and the attribute of the display target are sent to the terminal according to the sorting result.

This method can sort the attribute of each target according to the number of targets corresponding to the attribute of each target, and then send the display target and the attribute of the display target to the terminal according to the sorting result, which enables the user to quickly and accurately screen out the target that he/she wants to browse, and greatly improves the user experience.

In some embodiments of the present disclosure, taking the image to be searched as a commodity image as an example, the image content of the image attribute of the commodity image may be a commodity. For example, based on the commodity, 58 commodities that are similar to the commodity can be searched out from the index library. At this time, based on the principle of similarity, 20 commodities can be extracted from the 58 commodities that are similar to the commodity and used as a commodity set. The attribute values (for example, the attribute values can be brand ID, third-level category ID, style ID, etc.) of each commodity are obtained by traversing each commodity in the commodity set, and the number of occurrences of the brand ID, third-level category ID, style ID in the commodity set is calculated. Further, the number of commodities corresponding to the brand ID, third-level category ID, style ID is determined according to the number of occurrences of the brand ID, third-level category ID, style ID in the commodity set. Specifically, it is determined whether the brand ID, the third-level category ID, and the style ID have already appeared. If they do, the number of commodities corresponding to the attribute ID is added by 1, otherwise, the attribute ID is newly added and the corresponding number of commodities is set to 1. In this way, the number of commodities corresponding to the brand ID, third-level category ID, and style ID can be quickly determined. When the traversal is finished, the brand ID, the third-level category ID, and the style ID are sorted based on the number of commodities corresponding to the brand ID, the third-level category ID, and the style ID and the number of TopK attributes is taken as the aggregated result and returned to the terminal. K is determined according to the display situation of the terminal.

In some embodiments of the present disclosure, taking the image to be searched as a commodity image as an example, the image content of the commodity image may be the brand of the commodity, the color of the commodity, the shape of the commodity, the third-level category of the commodity, and so on. For example, targets that are similar or the same as the brand can be searched out from the index library according to the brand of the commodity. At this time, the attribute value, such as the brand ID of the target, can be obtained from each target that is similar or the same as the brand. In this example, the number of occurrences of the brand ID of the target in the search result can be calculated by traversing the result searched out from the index library according to the brand of the commodity. Further, the number of targets corresponding to the brand ID of the target is determined according to the the number of occurrences of the brand ID of the target in the target set. Specifically, it is determined whether the brand ID has already appeared. If it does, the number of commodities corresponding to the attribute ID is added by 1, otherwise, the attribute ID is newly added and the corresponding number of commodities is set to 1. Similarly, according to the above calculation method, the number of targets corresponding to the color ID of the commodity, the shape ID of the commodity, and the third-level category ID of the commodity can also be calculated. When the traversal is finished, the brand IDs are sorted based on the number of targets corresponding to each attribute ID, and the number of TopK attributes is taken as the aggregated result and returned to the terminal. K is determined according to the display situation of the terminal.

Figure 6:
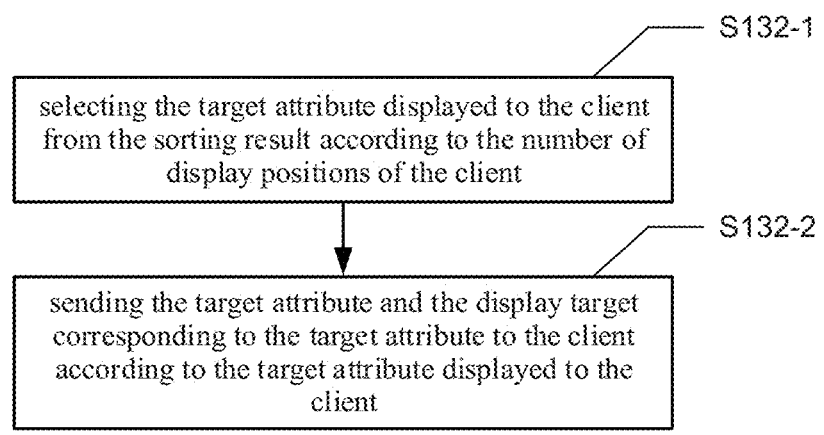
FIG. 6 schematically shows a flowchart of an image-based search method applied to a server according to another embodiment of the present disclosure.

FIG. 6 schematically shows a flowchart of an image-based search method applied to a server according to another embodiment of the present disclosure.

As shown in FIG. 6, the above step S132 may specifically include step S132-1 and step S132-2.

In step S132-1, the target attribute displayed to the terminal is selected from the sorting result according to the number of display positions of the terminal.

In step S132-2, the target attribute and the display target corresponding to the target attribute are sent to the terminal according to the target attribute displayed to the terminal.

The method can select the target attribute displayed to the terminal from the above sorting result according to the number of display positions of the terminal, and the target attributes and display targets displayed to the terminal determined in this way are more flexible, and the user experience is further improved.

In some embodiments of the present disclosure, the number of display positions of the terminal can be determined by the type of the terminal. For example, the terminal is a mobile device (for example, a mobile phone, a tablet computer, etc.), and the terminal is a variety of computers (for example, a laptop, a desktop computer, etc.), the number of display positions of the mobile device may be less relative to the variety of computers.

Figure 7:
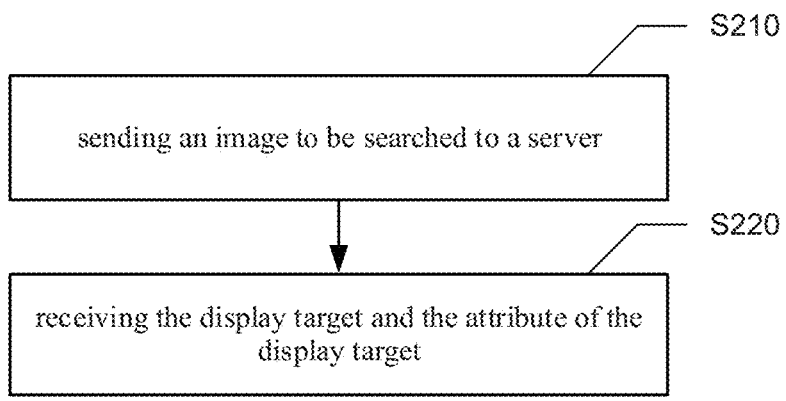
FIG. 7 schematically shows a flowchart of an image-based search method applied to a terminal according to an embodiment of the present disclosure.

FIG. 7 schematically shows a flowchart of an image-based search method applied to a terminal according to an embodiment of the present disclosure.

As shown in FIG. 7, the image-based search method applied to the terminal includes step S210 and step S220.

In step S210, an image to be searched is sent to a server, such that the server extracts a target set from an index library according to an image content in an image to be searched, determines the number of targets corresponding to an attribute of each target according to the attribute of each target in the target set, and sends a display target and an attribute of the display target to a terminal according to the number of targets corresponding to the attribute of each target.

In step S220, the display target and the attribute of the display target are received.

The method can send an image to be searched to a server, such that the server extracts a target set from an index library according to an image content in an image to be searched, determines the number of targets corresponding to an attribute of each target according to the attribute of each target in the target set, and sends a display target and an attribute of the display target to a terminal according to the number of targets corresponding to the attribute of each target, such that the terminal can receive the display target and the attribute of the display target. At this time, users can quickly and accurately screen out the targets they want to browse, which greatly improves user experience.

In some embodiments of the present disclosure, after the above step S220, the method further includes: receiving an attribute of a display target designated by a user, such that the server responds to an operation of the user designating the attribute of the display target and sends the display target corresponding to the attribute of the display target designated by the user to the terminal; receiving the display target corresponding to the attribute of the display target designated by the user.

The method can receive an attribute of a display target designated by a user, such that the server responds to an operation of the user designating the attribute of the display target and sends the display target corresponding to the attribute of the display target designated by the user to the terminal; and then receives the display target corresponding to the attribute of the display target designated by the user. In this way, the targets designated by the user can be quickly screened out, which further saves the time for screening for the user.

Figure 8A:
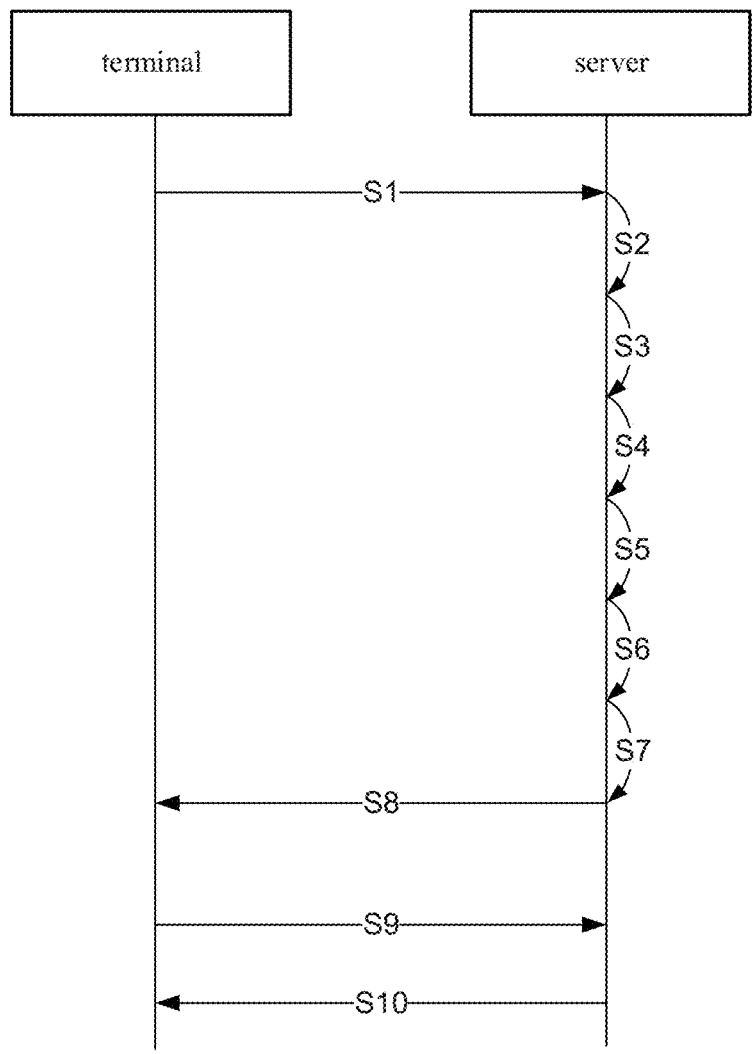
FIG. 8A schematically shows a schematic diagram of interaction between a terminal and a server according to an embodiment of the present disclosure.

In the following, referring to FIG. 8A, a specific embodiment is used to describe the interaction process between the server and the terminal. S1 and S9 are executed by the terminal, S2~S8 and S10 are executed by the server.

The interaction scene between the terminal and the server is as follows: S1, the user uses the terminal to send a mobile phone image to the server; S2, when the server receives the mobile phone image, it obtains the image content (i.e., the mobile phone) of the mobile phone image by identifying the mobile phone image; S3, searching for mobile phones similar to the image content from each index library according to the acquired image content; S4, extracting mobile phones that are similar to the image content from each search result based on the principle of similarity, and using them as the commodity set; S5, obtaining the attributes of each mobile phone by traversing the commodity set; S6, after the traversal is finished, calculating the number of times that attributes of each mobile phone appear in the commodity set; S7, determining the number of mobile phones corresponding to the attributes of each target according to the number of times that attributes of each mobile phone appear in the commodity set; S8, sending the display target and attributes of the display target to the terminal according to the number of mobile phones corresponding to the attributes of each mobile phone, so that users can quickly and accurately screen out the target he/she wants to browse, which greatly improves the user experience. In addition, S9, the terminal receives the user's operation on the attributes of the display target; S10, a display target corresponding to the attribute of the display target designated by a user is sent to the terminal, in response to an operation of the user designating the attribute of the display target. In this way, the targets designated by the user can be quickly screened out from the display target and the attributes of the display target in step S8, which further saves the time for screening for the user.

Figure 8B:
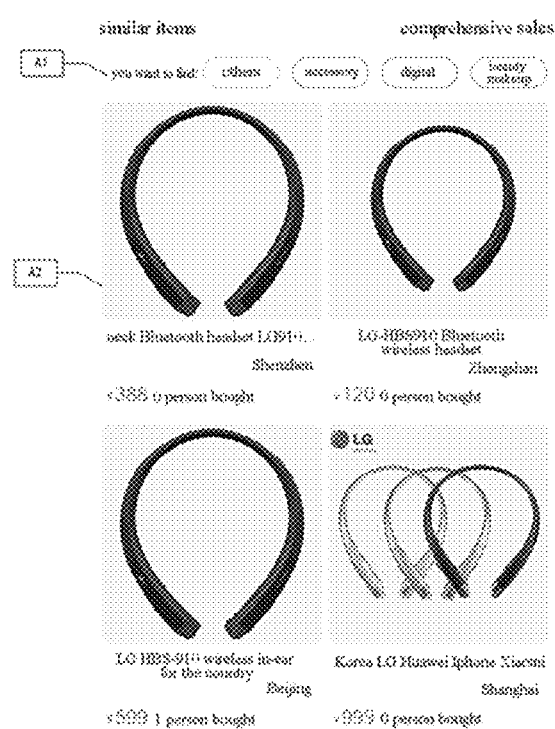
FIG. 8B schematically shows a schematic diagram of displayed targets and target attributes shown in the related art.
Figure 8C:
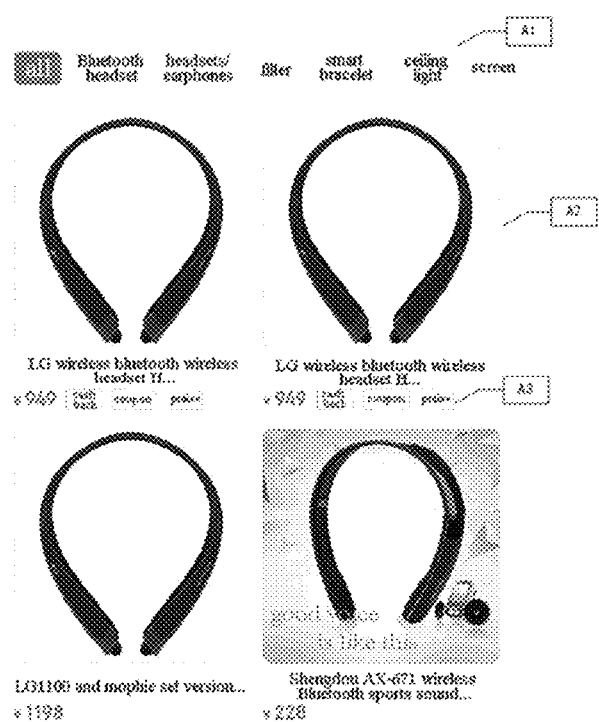
FIG. 8C schematically shows a schematic diagram of displayed targets and target attributes according to an embodiment of the present disclosure.

The interface changes in displaying commodities and commodity attributes in the present disclosure and related technologies can specifically refer to FIG. 8B and FIG. 8C.

FIG. 8B shows the results searched based on a headset image in the related technology. In the search result, A1 is the commodity attribute corresponding to the image content, and A2 is the result searched based on a headset image. The commodity attributes and the coverage of the commodities in A1 and A2 are too wide, and it is difficult to quickly and accurately screen out the commodities that users want to browse. On the contrary, FIG. 8C shows the results searched based on a headset image in the present disclosure. In the search result, A1 is the commodity attribute corresponding to the image content, and A2 is the result searched based on a headset image. The commodity attributes and the coverage of the commodities in A1 and A2 are relatively small. A3 is also displayed in the search result of the present disclosure, so as to realize aggregating the plurality of "if the total purchase amount reaches M, N will be deducted" into "deduction from the total purchase amount", and aggregating the plurality of "N off for purchase quantity of M or more" into "discount", or the like, which is not only convenient for users to watch, but also reduces the requirements for display positions of the terminal.

In addition, if the user clicks on the screening control in FIG. 8C, in addition to the third-level category contained in A1, the terminal can also display other attributes of the commodity, such as the style of the commodity (for example, simple and modern, sports, etc.), the brand of the commodity (for example, Huawei, Xiaomi, LG), or the like. In this case, the user can not only click the commodity attributes in A1, but also can click the style of the commodity and the brand of the commodity. The targets designated by the user can be quickly screened out from the display target and the attributes of the display target in step S8, which further saves the time spent in screening for the user.

Figure 9:
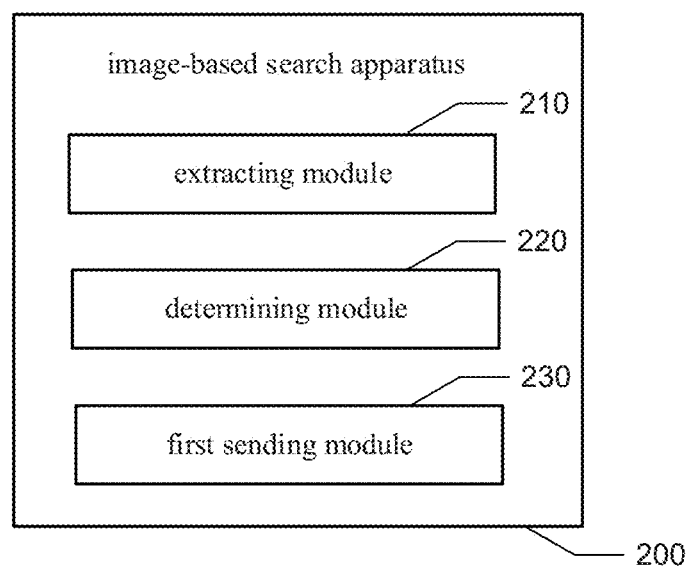
FIG. 9 schematically shows a block diagram of an image-based search apparatus applied to a server according to an embodiment of the present disclosure.

FIG. 9 schematically shows a block diagram of an image-based search apparatus applied to a server according to an embodiment of the present disclosure.

As shown in FIG. 9, the image-based search apparatus 200 includes an extracting module 210, a determining module 220 and a first sending module 230.

Specifically, the extracting module 210 is configured to extract a target set from an index library according to an image content in an image to be searched.

The determining module 220 is configured to determine the number of targets corresponding to an attribute of each target according to the attribute of each target in the target set.

The first sending module 230 is configured to send a display target and an attribute of the display target to a terminal according to the number of targets corresponding to the attribute of each target.

The image-based search apparatus 200 can extract a target set from an index library according to an image content in an image to be searched, wherein each target in the target set has an attribute similar to the image content; determine the number of targets corresponding to the attribute of each target according to the attribute of each target in the target set; and send a display target and the attribute of the display target to a terminal according to the number of targets corresponding to the attribute of each target, such that a user can quickly and accurately screen out a target that he/she wants to browse, thereby greatly improving the user experience. For example, if the image to be searched is an image of a commodity, the method of the present disclosure helps users to quickly and accurately screen out the target commodity from a large number of recalled commodities, which greatly improves the user experience, and ultimately greatly increases the total transaction volume.

According to an embodiment of the present disclosure, the image-based search apparatus 200 is used to implement the image-based search method described in the embodiment of FIG. 2.

Figure 10:
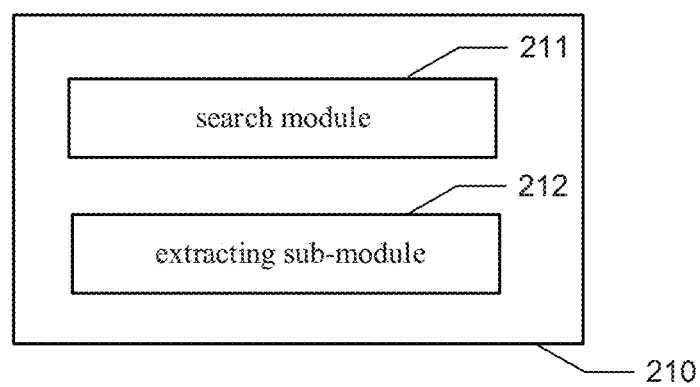
FIG. 10 schematically shows a block diagram of an image-based search apparatus applied to a server according to another embodiment of the present disclosure.

FIG. 10 schematically shows a block diagram of an image-based search apparatus applied to a server according to another embodiment of the present disclosure.

As shown in FIG. 10, the aforementioned extracting module 210 includes a search module 211 and an extracting sub-module 212.

Specifically, the search module 211 is configured to search for targets similar to the image content from the index library according to the image content in the image to be searched.

The extracting sub-module 212 is configured to extract the target set from the searched targets based on a principle of similarity.

The extracting module 210 can search out targets similar to the image content from the index library according to the image content in the image to be searched, and then extract the target set from the searched targets based on the principle of similarity. In this way, targets that are similar to each image content are preliminarily extracted from the targets searched out according to each image content in the image to be searched, making it easier to count the number of targets corresponding to the attributes of each target subsequently.

According to an embodiment of the present disclosure, the extracting module 210 is used to implement the image-based search method described in the embodiment of FIG. 3.

Figure 11:
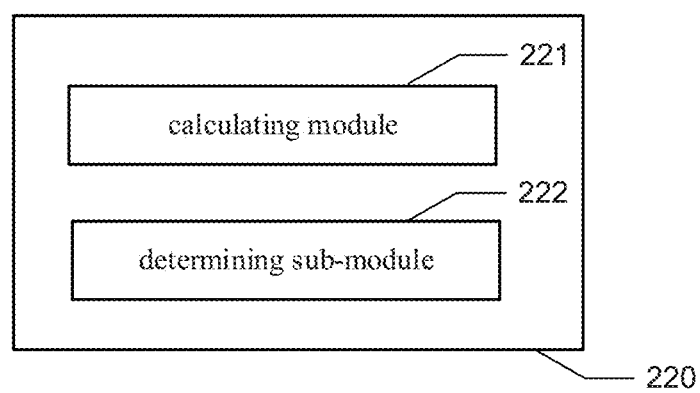
FIG. 11 schematically shows a block diagram of an image-based search apparatus applied to a server according to another embodiment of the present disclosure.

FIG. 11 schematically shows a block diagram of an image-based search apparatus applied to a server according to another embodiment of the present disclosure.

As shown in FIG. 11, the above determining module 220 includes a calculating module 221 and a determining sub-module 222.

Specifically, the calculating module 221 is configured to calculate the number of occurrences of the attribute of each target in the target set.

The determining sub-module 222 is configured to determine the number of targets corresponding to the attribute of each target according to the number of occurrences of the attribute of each target in the target set.

The determining module 220 can determine the number of targets corresponding to the attribute of each target according to the number of occurrences of the attribute of each target in the target set, so that the display target and the attributes of the display target can be sent to the terminal according to the number of targets corresponding to the attributes of each target subsequently, which enables the user to quickly and accurately screen out the target that he/she wants to browse, and greatly improves the user experience.

According to an embodiment of the present disclosure, the determining module 220 is used to implement the image-based search method described in the embodiment of FIG. 4.

Figure 12:
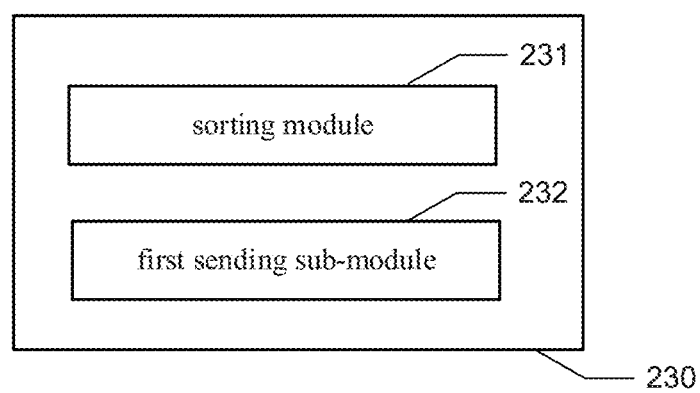
FIG. 12 schematically shows a block diagram of an image-based search apparatus applied to a server according to another embodiment of the present disclosure.

FIG. 12 schematically shows a block diagram of an image-based search apparatus applied to a server according to another embodiment of the present disclosure.

As shown in FIG. 12, the above-mentioned first sending module 230 includes a sorting module 231 and a first sending sub-module 232.

Specifically, the sorting module 231 is configured to sort the attribute of each target according to the number of targets corresponding to the attribute of each target.

The first sending sub-module 232 is configured to send the display target and the attribute of the display target to the terminal according to the sorting result.

The first sending module 230 can sort the attribute of each target according to the number of targets corresponding to the attribute of each target, and then send the display target and the attribute of the display target to the terminal according to the sorting result, which enables the user to quickly and accurately screen out the target that he/she wants to browse, and greatly improves the user experience.

According to an embodiment of the present disclosure, the first sending module 230 is used to implement the image-based search method described in the embodiment of FIG. 5.

Figure 13:
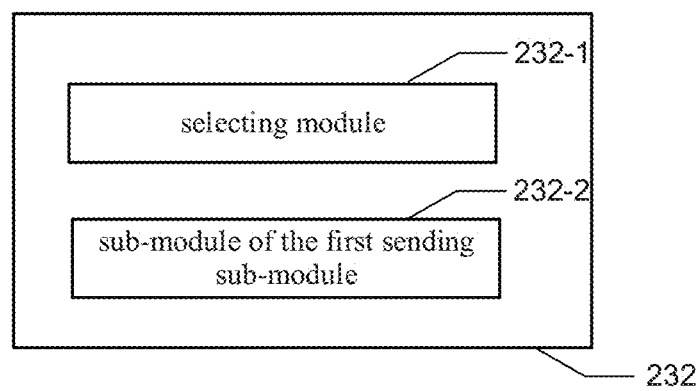
FIG. 13 schematically shows a block diagram of an image-based search apparatus applied to a server according to another embodiment of the present disclosure.

FIG. 13 schematically shows a block diagram of an image-based search apparatus applied to a server according to another embodiment of the present disclosure.

As shown in FIG. 13, the above-mentioned first sending sub-module 232 includes a selecting module 232-1 and a sub-module 232-2 of the first sending sub-module.

Specifically, the selecting module 232-1 is configured to select the target attribute displayed to the terminal from the sorting result according to the number of display positions of the terminal.

The sub-module 232-2 of the first sending sub-module is configured to send the target attribute and the display target corresponding to the target attribute to the terminal according to the target attribute displayed to the terminal.

The first sending sub-module 232 can select the target attribute displayed to the terminal from the above sorting result according to the number of display positions of the terminal, and the target attributes displayed to the terminal determined in this way are more flexible, and the user experience is further improved.

According to an embodiment of the present disclosure, the first recommending sub-module 232 is used to implement the image-based search method described in the embodiment of FIG. 6.

Figure 14:
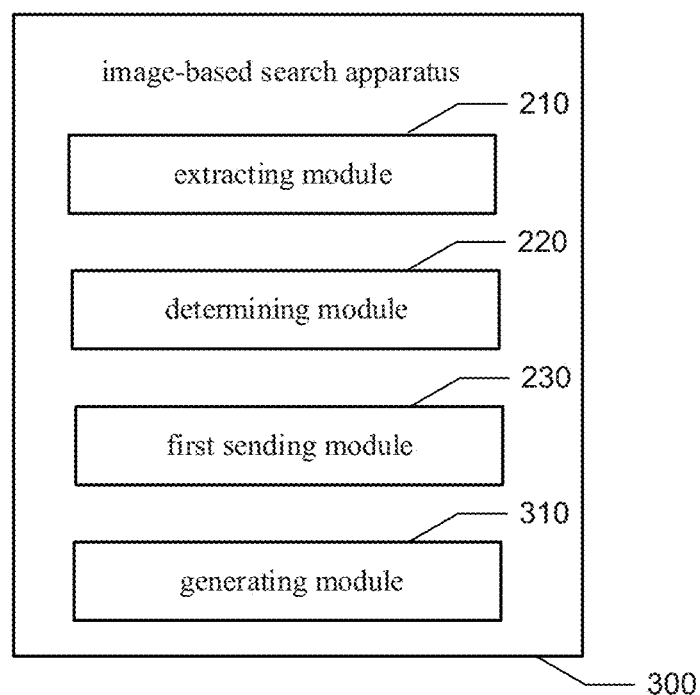
FIG. 14 schematically shows a block diagram of an image-based search apparatus applied to a server according to another embodiment of the present disclosure.

FIG. 14 schematically shows a block diagram of an image-based search apparatus applied to a server according to another embodiment of the present disclosure.

As shown in FIG. 14, in addition to the extracting module 210, the determining module 220 and the first sending module 230 described in the embodiment of FIG. 9, the image-based search apparatus 300 includes a generating module 310.

Specifically, the generating module 310 is configured to, in the target set, when a target has a plurality of types of similar or identical promotional information, generate one type of promotional information based on the plurality of types of similar or identical promotional information.

The image-based search apparatus 200 can generate a kind of promotional information based on a variety of similar or identical promotional information, which is convenient for users to watch.

Figure 15:
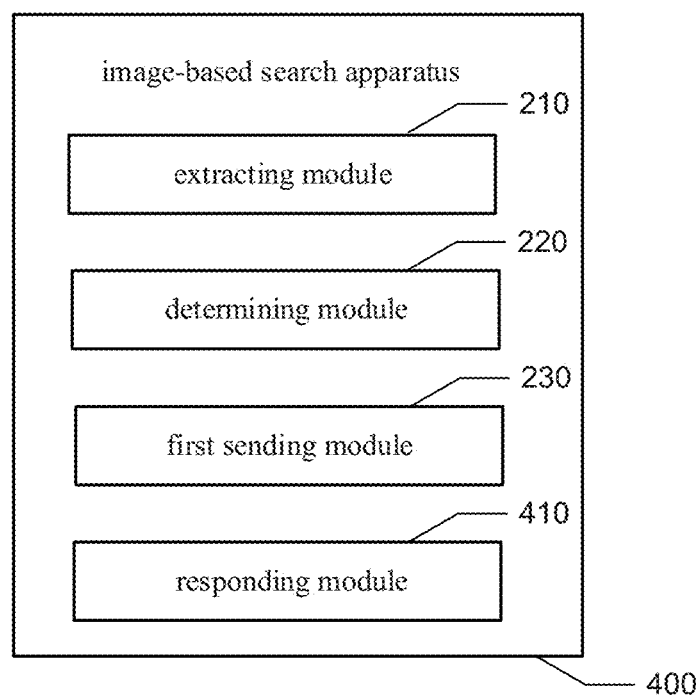
FIG. 15 schematically shows a block diagram of an image-based search apparatus applied to a server according to another embodiment of the present disclosure.

FIG. 15 schematically shows a block diagram of an image-based search apparatus applied to a server according to another embodiment of the present disclosure.

As shown in FIG. 15, in addition to the extracting module 210, the determining module 220 and the first sending module 230 described in the embodiment of FIG. 9, the image-based search apparatus 400 includes a responding module 410.

Specifically, the responding module 410 is configured to send a display target corresponding to the attribute of the display target designated by a user to the terminal, in response to an operation of the user designating the attribute of the display target.

The image-based search apparatus 400 can send a display target corresponding to the attribute of the display target designated by a user to the terminal, in response to an operation of the user designating the attribute of the display target, so that the targets designated by user quickly screened out from the display target and the attributes of the display target can be sent to the terminal, which further saves the time spent in screening for the user.

It can be understood that the extracting module 210, the search module 211, the extracting sub-module 212, the determining module 220, the calculating module 221, the determining sub-module 222, the first sending module 230, the sorting module 231, the first sending sub-module 232, the selecting module 232-1, the sub-module 232-2 of the first sending sub-module, the generating module 310, and the responding module 410 may be combined into one module for implementation, or any one of the modules may be split into multiple modules. Or, at least a part of the functions of one or more of these modules may be combined with at least part of the functions of other modules, and implemented in one module. According to the embodiment of the present invention, at least one of the extracting module 210, the search module 211, the extracting sub-module 212, the determining module 220, the calculating module 221, the determining sub-module 222, the first sending module 230, the sorting module 231, the first sending sub-module 232, the selecting module 232-1, the sub-module 232-2 of the first sending sub-module, the generating module 310, and the responding module 410 may be at least partially implemented as a hardware circuit, such as a field programmable gate array (FPGA), a programmable logic array (PLA), a system on chip, a system on substrate, a system on package, an application specific integrated circuit (ASIC), or implemented by the hardware or firmware to integrate or package the circuit in any other reasonable way, or implemented by an appropriate combination of software, hardware, and firmware. Or, at least one of the extracting module 210, the search module 211, the extracting sub-module 212, the determining module 220, the calculating module 221, the determining sub-module 222, the first sending module 230, the sorting module 231, the first sending sub-module 232, the selecting module 232-1, the sub-module 232-2 of the first sending sub-module, the generating module 310, and the responding module 410 can be at least partially implemented as a computer program module, and when the program is run by a computer, the function of the corresponding module can be executed.

Figure 16:
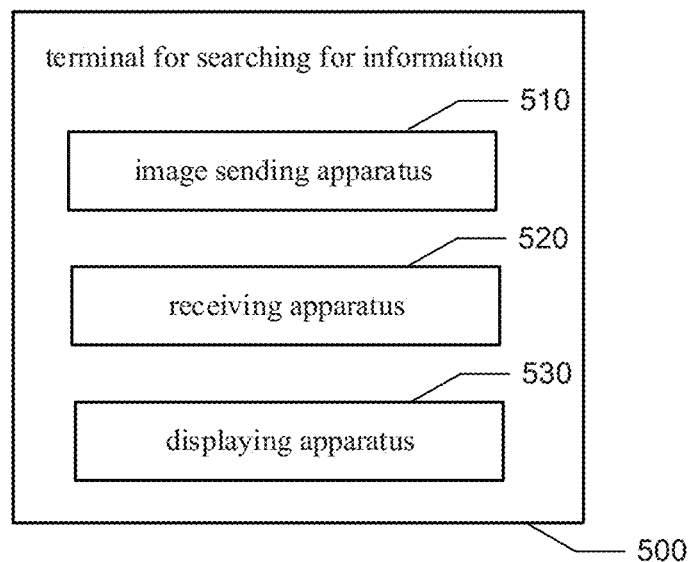
FIG. 16 schematically shows a block diagram of a terminal for searching for information according to an embodiment of the present disclosure.

FIG. 16 schematically shows a block diagram of a terminal for searching for information according to an embodiment of the present disclosure.

As shown in FIG. 16, the terminal 500 for searching for information includes an image sending apparatus 510, a receiving apparatus 520, and a displaying apparatus 530.

Specifically, an image sending apparatus 510 is configured to send an image to be searched to a server, such that the server extracts a target set from an index library according to an image content in an image to be searched, determines the number of targets corresponding to an attribute of each target according to the attribute of each target in the target set, and sends a display target and an attribute of the display target to a terminal according to the number of targets corresponding to the attribute of each target.

The receiving apparatus 520 is configured to receive the display target and the attribute of the display target.

The displaying apparatus 530 is configured to display the display target and the attribute of the display target.

The terminal 500 for searching for information can send an image to be searched to a server, such that the server extracts a target set from an index library according to an image content in an image to be searched, determines the number of targets corresponding to an attribute of each target according to the attribute of each target in the target set, and sends a display target and an attribute of the display target to a terminal according to the number of targets corresponding to the attribute of each target, such that the terminal can receive the display target and the attribute of the display target. At this time, users can quickly and accurately screen out the targets they want to browse, which greatly improves user experience.

According to an embodiment of the present disclosure, the terminal 500 for searching for information is used to implement the image-based search method described in the embodiment of FIG. 7.

In some embodiments of the present disclosure, the terminal 500 for searching for information further includes: an image acquiring apparatus, configured as an acquiring apparatus for acquiring an image to be searched.

In some embodiments of the present disclosure, the image acquiring apparatus includes a camera installed on the terminal.

In some embodiments of the present disclosure, the terminal 500 for searching for information further include: an input apparatus, configured to receive an attribute of a display target designated by a user and send the attribute of the display target designated by the user to the server, such that the server responds to an operation of the user designating the attribute of the display target and sends the display target corresponding to the attribute of the display target designated by the user to the terminal, wherein the receiving apparatus 520 is further configured to receive the display target corresponding to the attribute of the display target designated by the user; wherein the display apparatus 530 is further configured to display the display target corresponding to the attribute of the display target designated by the user.

In some embodiments of the present disclosure, the display apparatus 530 and the input apparatus are integrated as a touch-sensitive display apparatus, and the touch-sensitive display apparatus is configured to display the display target and the attribute of the display target, and input the attribute of the display target designated by the user.

The beneficial effects of the image-based search method applied to the server provided by the present disclosure are as follows.

Through the technical solution provided by the embodiments of the present disclosure, the server can extract a target set from an index library according to an image content in an image to be searched, wherein each target in the target set has attributes similar to the image content; determine the number of targets corresponding to the attribute of each target according to the attribute of each target in the target set; and send a display target and the attribute of the display target to a terminal according to the number of targets corresponding to the attribute of each target, such that a user can quickly and accurately screen out a target that he/she wants to browse, thereby greatly improving the user experience.

The beneficial effects of the image-based search method applied to the terminal provided by the present disclosure are as follows.

Through the technical solution provided by the embodiments of the present disclosure, the terminal can send the image to be searched to the server, so that the server extracts a target set from an index library according to an image content in an image to be searched; determines the number of targets corresponding to the attribute of each target according to the attribute of each target in the target set; and sends a display target and the attribute of the display target to a terminal according to the number of targets corresponding to the attribute of each target, such that the terminal can receive the display target and the attribute of the display target. At this time, a user can quickly and accurately screen out a target that he/she wants to browse, thereby greatly improving the user experience.

Figure 17:
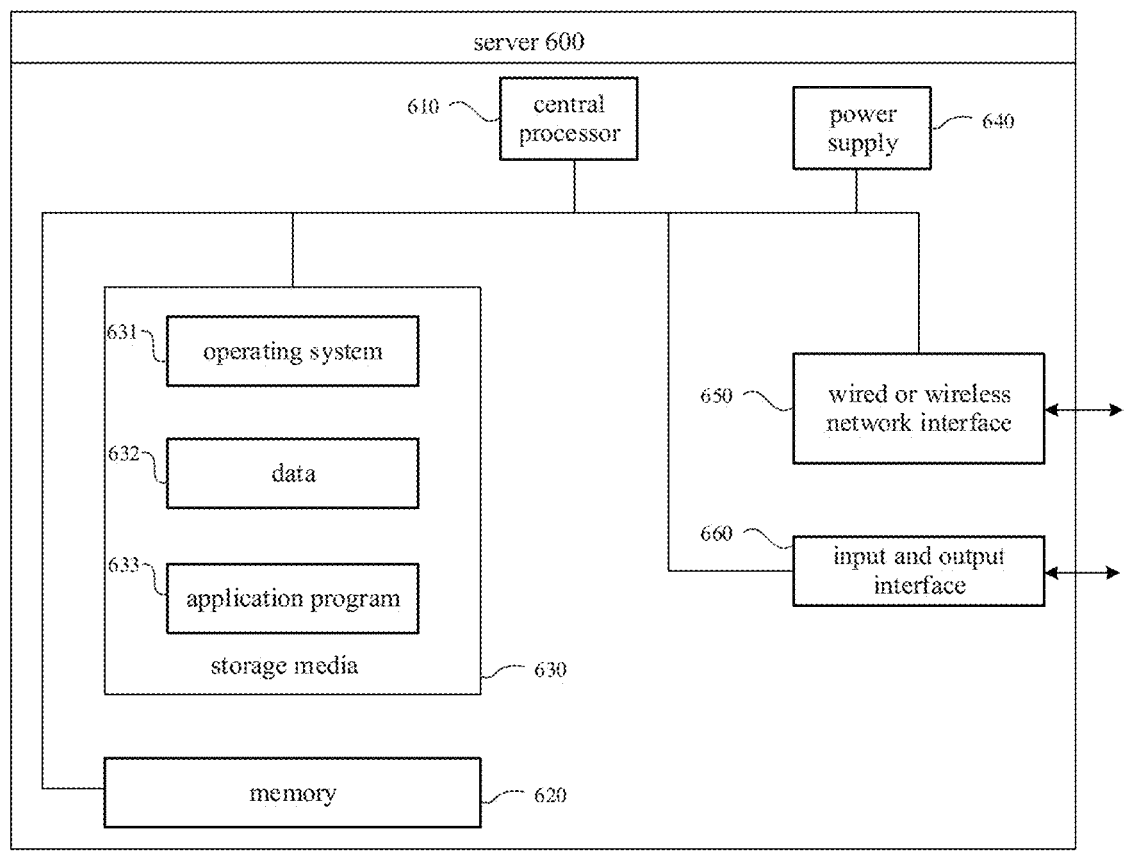
FIG. 17 schematically shows a structural diagram of a server according to an embodiment of the present disclosure.

FIG. 17 schematically shows a schematic diagram of a server according to an embodiment of the present disclosure. According to an embodiment of the present disclosure, the server may be the server 105 in FIG. 1. The server can be used to execute the image-based search method applied to the server provided in the above embodiment.

Referring to FIG. 17, the server 600 may have relatively large differences due to different configurations or performances, and may include one or more central processing units (CPU) 610 (for example, one or more processors) and a memory 620, one or more storage media 630 for storing application programs 633 or data 632 (for example, one or more mass storage devices). Among them, the memory 620 and the storage medium 630 may be short-term storage or persistent storage. The program stored in the storage medium 630 may include one or more modules (not shown in the figure), and each module may include a series of command operations on the server. Furthermore, the central processor 610 may be configured to communicate with the storage medium 630, and execute a series of instruction operations in the storage medium 630 on the server 600.

The server 600 may also include one or more power supplies 640, one or more wired or wireless network interfaces 650, one or more input and output interfaces 660, and/or one or more operating systems 631, such as Windows Server™, Mac OS X™, Unix™, Linux™, FreeBSD™, or the like. After the configuration, one or more central processors 610 can execute operations performed by the server in the foregoing method embodiments.

For example, when the aforementioned application program 633 (for example, a search engine) is executed by the central processor 610, the image to be searched can be received through the wired or wireless network interface 650 or the input/output interface 660, and then the image to be searched can be processed by the application program 633 to obtain the image content in the image to be searched, and through the application program 633, the target set can be extracted from the index library according to the image content in the image to be searched, and the number of targets corresponding to the attributes of each target is determined according to the attributes of each target in the target set, and the display target and the attributes of the display target is sent to the terminal according to the target number corresponding to the attributes of each target. In this embodiment, the index library may be the index library in the aforementioned memory 620 or the aforementioned storage medium.

For another example, when the application program 633 (for example, a search engine) is executed by the central processor 610, the application program 633 can search out targets similar to the image content from the index library according to the image content in the image to be searched; and extract the target set from the searched targets based on a principle of similarity.

For another example, when the above-mentioned application program 633 (for example, the search engine) is executed by the central processor 610, the application program 633 can calculate the number of occurrences of the attribute of each target in the target set; and determine the number of targets corresponding to the attribute of each target according to the number of occurrences of the attribute of each target in the target set.

For another example, when the above-mentioned application program 633 (for example, a search engine) is executed by the central processor 610, the application program 633 can sort the attribute of each target according to the number of targets corresponding to the attribute of each target; and send the display target and the attribute of the display target to the terminal according to the sorting result.

For another example, when the application program 633 (for example, a search engine) is executed by the central processor 610, the application program 633 can select the target attribute displayed to the terminal from the sorting result according to the number of display positions of the terminal; and send the target attribute and the display target corresponding to the target attribute to the terminal according to the target attribute displayed to the terminal.

For another example, when the above-mentioned application program 633 (for example, a search engine) is executed by the central processor 610, in the target set, when a target has a plurality of types of similar or identical promotional information, the application program 633 can generate one type of promotional information based on the plurality of types of similar or identical promotional information.

For another example, when the application program 633 (for example, a search engine) is executed by the central processor 610, after the application program 633 sends a display target and an attribute of the display target to a terminal according to the number of targets corresponding to the attribute of each target, the application program 633 may further send a display target corresponding to the attribute of the display target designated by a user to the terminal, in response to an operation of the user designating the attribute of the display target.

Figure 18:
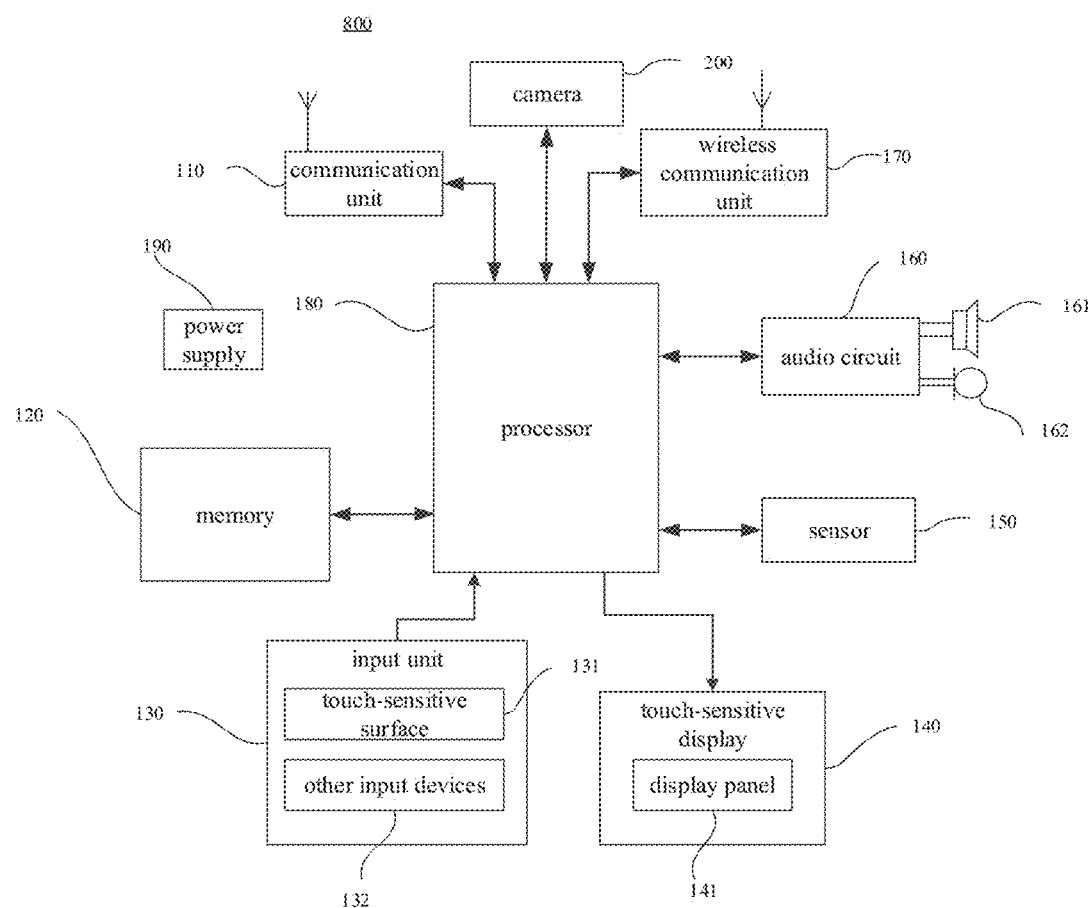
FIG. 18 schematically shows a structural diagram of a terminal according to an embodiment of the present disclosure.

FIG. 18 is a schematic structural diagram of a terminal in an embodiment of the present disclosure. Referring to FIG. 18, the terminal can be used to implement the image-based search method applied to the terminal provided in the foregoing embodiment.

The terminal device 800 may include a communication unit 110, a memory 120 including one or more computer-readable storage media, an input unit 130, a touch-sensitive display 140, a sensor 150, an audio circuit 160, a wireless communication unit 170, a processor 180 including one or more processing cores, a power supply 190 and other components. Those skilled in the art can understand that the structure of the terminal device shown in FIG. 18 does not constitute a limitation on the terminal device, and may include more or fewer components than those shown in the figure, or certain components may be combined, or have different component arrangements.

The communication unit 110 may be used for receiving and sending signals during information transmission or communication. The communication unit 110 may be an RF (Radio Frequency) circuit, a router, a modem, or other network communication devices. In particular, when the communication unit 110 is an RF circuit, after receiving the downlink information of the base station, it is processed by one or more processors 180; in addition, the data related to the uplink is sent to the base station. Generally, the RF circuit as a communication unit includes but is not limited to an antenna, at least one amplifier, a tuner, one or more oscillators, a subscriber identity module (SIM) card, a transceiver, a coupler, and an LNA (Low Noise Amplifier), a duplexer, etc. In addition, the communication unit 110 may also communicate with the network and other devices through wireless communication. Wireless communication can use any communication standard or protocol, including but not limited to GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc. The memory 120 may be used to store software programs and modules. The processor 180 executes various functional applications and data processing by running the software programs and modules stored in the memory 120. The memory 120 may mainly include a program storage area and a data storage area. The program storage area may store an operating system, an application program required by at least one function (such as a sound playback function, an image playback function, etc.), etc.; the data storage area may store data (such as audio data, phone book, etc.) created by the use of the terminal device 800, etc. In addition, the memory 120 may include a high-speed random access memory, and may also include a non-volatile memory, such as at least one magnetic disk storage device, a flash memory device, or other volatile solid-state storage devices. Correspondingly, the memory 120 may further include a memory controller to provide access to the memory 120 by the processor 180 and the input unit 130.

The input unit 130 can be used to receive input digital or character information, and generate keyboard, mouse, joystick, optical or trackball signal input related to user settings and function control. The input unit 130 may include a touch-sensitive surface 131 and other input devices 132. The touch-sensitive surface 131, also called a touch screen or a touchpad, can collect the user's touch operations (for example, operation on or near the touch-sensitive surface 131 caused by the user using any suitable objects or accessories such as fingers, stylus, etc.) on or near it, and drive the corresponding connection device according to the preset program. Optionally, the touch-sensitive surface 131 may include two parts, a touch detection device and a touch controller. Among them, the touch detection device detects the user's touch position, and detects the signal brought by the touch operation, and transmits the signal to the touch controller; the touch controller receives the touch information from the touch detection device, converts it into contact coordinates, and then sends it to the processor 180, and can receive and execute the commands sent by the processor 180. In addition, the touch-sensitive surface 131 can be implemented in multiple types such as resistive, capacitive, infrared, and surface acoustic wave. In addition to the touch-sensitive surface 131, the input unit 130 may also include other input devices 132. The other input device 132 may include, but is not limited to, one or more of a physical keyboard, a function key (such as a volume control button, a switch button, etc.), a trackball, a mouse, and a joystick, or the like.

The touch-sensitive display 140 may be used to display information input by the user or information provided to the user and various graphical user interfaces of the terminal device 800. These graphical user interfaces may be composed of graphics, text, icons, videos, and any combination thereof. The touch-sensitive display 140 may include a display panel 141. Optionally, the display panel 141 may be configured in the form of LCD (Liquid Crystal Display), OLED (Organic Light-Emitting Diode), etc. Further, the touch-sensitive surface 131 may cover the display panel 141. When the touch-sensitive surface 131 detects a touch operation on or near it, it is transmitted to the processor 180 to determine the type of the touch event, and then the processor 180 provides corresponding visual output on the display panel 141 according to the type of the touch event. Although in FIG. 10, the touch-sensitive surface 131 and the display panel 141 are used as two independent components to implement input and input functions, in some embodiments, the touch-sensitive surface 131 and the display panel 141 can be integrated to implement input and output functions.

The terminal device 800 may also include at least one sensor 150, such as a light sensor, a motion sensor, and other sensors. The light sensor can include an ambient light sensor and a proximity sensor. The ambient light sensor can adjust the brightness of the display panel 141 according to the brightness of the ambient light. The proximity sensor can close the display panel 141 and/or backlight when the terminal device 800 is moved to the ear. As a kind of motion sensor, the gravity acceleration sensor can detect the magnitude of acceleration in various directions (usually three axes), it can detect the magnitude and direction of gravity when it is stationary, can be used to identify the application of the cellphone attitude (such as horizontal and vertical screen switching, related games, magnetometer posture calibration), vibration recognition related functions (such as pedometer, percussion), etc.; as for the gyroscope, barometer, hygrometer, thermometer, infrared sensor and other sensors that can also be configured for the terminal device 800, they will not be repeated herein.

The audio circuit 160, the speaker 161, and the microphone 162 can provide an audio interface between the user and the terminal device 800. The audio circuit 160 can transmit the electrical signal converted from the received audio data to the speaker 161, and then the speaker 161 convertes into a sound signal for output; on the other hand, the microphone 162 converts the collected sound signal into an electrical signal, and it is converted into audio data after being received by the audio circuit 160, and then the audio data is output to the output processor 180 for processing, and then sent to another terminal device via the RF circuit 110, or the audio data is output to the memory 120 for further processing. The audio circuit 160 may also include an earplug jack to provide communication between a peripheral earphone and the terminal device 800.

In order to achieve wireless communication, a wireless communication unit 170 may be configured on the terminal device, and the wireless communication unit 170 may be a WIFI (Wireless Fidelity) module. WIFI is a short-distance wireless transmission technology. Through the wireless communication unit 170, the terminal device 800 can help users send and receive emails, browse web pages, and access streaming media, or the like. It provides users with wireless broadband Internet access. Although the wireless communication unit 170 is shown in FIG. 10, it may be understood that it is not a necessary component of the terminal device 800, and can be omitted as needed without changing the essence of the disclosure.

The processor 180 is the control center of the terminal device 800, which uses various interfaces and lines to connect various parts of the entire mobile phone, runs or executes software programs and/or modules stored in the memory 120, and calls data stored in the memory 120, performs various functions of the terminal device 800 and processes data, so as to monitor the mobile phone as a whole. Optionally, the processor 180 may include one or more processing cores; the processor 180 may integrate an application processor and a modem processor, where the application processor mainly processes the operating system, the user interface, and application programs, etc., and the modem processor mainly deals with wireless communication. It can be understood that the foregoing modem processor may not be integrated into the processor 180.

The terminal device 800 also includes a power supply 190 (such as a battery) for supplying power to various components. The power supply may be logically connected to the processor 180 through a power management system, so that functions such as charging, discharging, and power consumption management can be managed through the power management system. The power supply 190 may also include any components such as one or more DC or AC power supplies, a recharging system, a power failure detection circuit, a power converter or an inverter, and a power status indicator.

The terminal device 800 may further include a camera 200, and the camera may be used to obtain an image to be searched. Although not shown, the terminal device 800 may also include a Bluetooth module, etc., which will not be repeated here. In this embodiment, the terminal device 800 further includes a memory 120 and one or more programs. One or more programs are stored in the memory 120 and configured to be executed by one or more processors 180 to perform an image-based search method applied to a terminal provided by the embodiment of the present disclosure.

For example, when the above-mentioned programs (for example, application programs that support searching targets based on images) are executed by the processor 180, the user can obtain the image to be searched through the above-mentioned camera 200, and then send the image to the searched to server 600 through the communication unit 110 or the wireless communication unit 170 based on the program. When the server 600 searches out the display target and the attributes of the display target based on the image to be searched, the display target and the attributes of the display target sent by the server 600 can also be received through the communication unit 110 or the wireless communication unit 170 based on the program, and the display target and the attributes of the display target may be displayed on the display panel 141 of the touch-sensitive display 140. In this case, if the user operates the display target and the attributes of the display target on the display panel 141, the program can generate a request based on this operation, and can send the request to the server 600 through the communication unit 110 or the wireless communication unit 170 based on the program. After the server 600 responds to the request, based on the program, the display target corresponding to the attribute of the display target designated by the user may also be received through the communication unit 110 or the wireless communication unit 170, and the display target corresponding to the attribute of the display target designated by the user is display on the display panel 141.

In addition, typically, the mobile terminal described in the present disclosure may be various handheld terminal devices, such as mobile phones, personal digital assistants (PDAs), etc., so the protection scope of the present disclosure should not be limited to a specific type of a mobile terminal.

In addition, the method according to the present disclosure can also be implemented as a computer program executed by the central processing unit CPU. When the computer program is executed by the CPU, the above-mentioned functions defined in the method of the present disclosure are executed.

In addition, the above method steps and system units can also be implemented using a controller and a computer-readable storage device for storing a computer program that enables the controller to implement the above steps or unit functions.

In addition, it should be understood that the computer-readable storage device (e.g., memory) described herein may be volatile memory or non-volatile memory, or may include both volatile memory and non-volatile memory. By way of example and not limitation, non-volatile memory may include read only memory (ROM), programmable ROM (PROM), electrically programmable ROM (EPROM), electrically erasable programmable ROM (EEPROM), or flash memory Memory. Volatile memory can include random access memory (RAM), which can act as external cache memory. As an example and not limitation, RAM can be obtained in many forms, such as synchronous RAM (SRAM), dynamic RAM (DRAM), synchronous DRAM (SDRAM), double data rate SDRAM (DDR SDRAM), enhanced SDRAM (ESDRAM), synchronous link DRAM (SLDRAM) and direct Rambus RAM (DRRAM). The storage devices of the disclosed aspects are intended to include, but are not limited to, these and other suitable types of memory.

Those skilled in the art will also understand that the various exemplary logic blocks, modules, circuits, and algorithm steps described in conjunction with the disclosure herein can be implemented as electronic hardware, computer software, or a combination of both. In order to clearly illustrate this interchangeability of hardware and software, functions of various illustrative components, blocks, modules, circuits, and steps have been described in general terms. Whether this function is implemented as software or hardware depends on the specific application and the design constraints imposed on the entire system. Those skilled in the art can implement the described functions in various ways for each specific application, but such implementation decisions should not be construed as departing from the scope of the present disclosure.

The various exemplary logic blocks, modules, and circuits described in conjunction with the disclosure herein can be implemented or executed using the following components designed to perform the functions described herein: general-purpose processors, digital signal processors (DSP), dedicated Integrated circuits (ASIC), field programmable gate arrays (FPGA) or other programmable logic devices, discrete gate or transistor logic, discrete hardware components, or any combination of these components. A general-purpose processor may be a microprocessor, but alternatively, the processor may be any conventional processor, controller, microcontroller, or state machine. The processor may also be implemented as a combination of computing devices, for example, a combination of a DSP and a microprocessor, multiple microprocessors, one or more microprocessors combined with a DSP core, or any other such configuration.

The steps of the method or algorithm described in combination with the disclosure herein may be directly included in hardware, a software module executed by a processor, or a combination of the two. The software module may reside in RAM memory, flash memory, ROM memory, EPROM memory, EEPROM memory, registers, hard disk, removable disk, CD-ROM, or any other form of storage medium known in the art. An exemplary storage medium is coupled to the processor, such that the processor can read information from the storage medium or write information to the storage medium. In an alternative, the storage medium may be integrated with the processor. The processor and the storage medium may reside in the ASIC. The ASIC can reside in the user terminal. In an alternative, the processor and the storage medium may reside as discrete components in the user terminal.

In one or more exemplary designs, the functions described may be implemented in hardware, software, firmware, or any combination thereof. If implemented in software, the functions can be stored as one or more instructions or codes on a computer-readable medium or transmitted through the computer-readable medium. Computer-readable media include computer storage media and communication media, the communication media includes any media that facilitates the transfer of a computer program from one location to another. A storage medium may be any available medium that can be accessed by a general-purpose or special-purpose computer. By way of example and not limitation, the computer-readable medium may include RAM, ROM, EEPROM, CD-ROM or other optical disk storage devices, magnetic disk storage devices or other magnetic storage devices, or may be any other medium that can be used for carrying or storing the required program code in the form of instructions or data structures and can be accessed by a general-purpose or special-purpose computer or a general-purpose or special-purpose processor. Also, any connection can be properly termed a computer-readable medium. For example, if coaxial cable, fiber optic cable, twisted pair, digital subscriber line (DSL), or wireless technologies such as infrared, radio, and microwave is used to send software from a website, server, or other remote source, the above-mentioned coaxial cable, fiber optic cable, twisted pair, DSL or wireless technologies such as infrared, radio, and microwave are all included in the definition of media. As used herein, magnetic disks and optical disks include compact disks (CDs), laser disks, optical disks, digital versatile disks (DVD), floppy disks, and Blu-ray disks. The magnetic disks usually reproduce data magnetically, while optical disks use lasers to optically reproduce data. Combinations of the above content should also be included in the scope of computer-readable media.

The embodiments of the present disclosure have been described above. However, these examples are for illustrative purposes only, and are not intended to limit the scope of the present disclosure. Although respective embodiments are described above, this does not mean that the measures in the respective embodiments cannot be advantageously used in combination. The scope of the present disclosure is defined by the appended claims and their equivalents. Without departing from the scope of the present disclosure, those skilled in the art can make various substitutions and modifications, and these substitutions and modifications should all fall within the scope of the present disclosure.

What is claimed is:

1. An image-based search method, applied to a server, the method comprising:
    extracting a target set from an index library according to an image content in an image;
    determining the number of targets corresponding to an attribute of each target according to the attribute of each target in the target set; and
    sending a display target and an attribute of the display target to a terminal according to the number of targets corresponding to the attribute of each target,
    wherein the method further comprises:
    in the target set, when a target has a plurality of types of similar promotional information, generating one type of promotional information based on the plurality of types of similar promotional information, in response that the promotional information is that N is deducted when a total purchase amount reaches M, generating one type of promotional information based on the plurality of types of similar promotional information comprises aggregating a plurality of "N is deducted when the total purchase amount reaches M" into "deduction from the total purchase amount",
    wherein determining the number of targets corresponding to an attribute of each target according to the attribute of each target in the target set comprises:
    calculating the number of occurrences of the attribute of each target in the target set;
    determining the number of targets corresponding to the attribute of each target according to the number of occurrences of the attribute of each target in the target set.

2. The method according to claim 1, wherein extracting a target set from an index library according to an image content in an image comprises:
    searching for targets similar to the image content from the index library according to the image content in the image;
    extracting the target set from the searched targets based on a principle of similarity.

3. The method according to claim 1, wherein sending a display target and an attribute of the display target to a terminal according to the number of targets corresponding to the attribute of each target comprises:
    sorting the attribute of each target according to the number of targets corresponding to the attribute of each target;
    sending the display target and the attribute of the display target to the terminal according to the sorting result.

4. The method according to claim 3, wherein sending the display target and the attribute of the display target to the terminal according to the sorting result comprises:
    selecting the target attribute displayed to the terminal from the sorting result according to the number of display positions of the terminal;
    sending the target attribute and the display target corresponding to the target attribute to the terminal according to the target attribute displayed to the terminal.

5. The method according to claim 1, wherein after sending a display target and an attribute of the display target to a terminal according to the number of targets corresponding to the attribute of each target, the method further comprises:
    sending a display target corresponding to the attribute of the display target designated by a user to the terminal, in response to an operation of the user designating the attribute of the display target.

6. An image-based search method, applied to a terminal, the method comprising:
    sending an image to a server, to enable the server to extract a target set from an index library according to an image content in an image, determining the number of targets corresponding to an attribute of each target according to the attribute of each target in the target set, and sending a display target and an attribute of the display target to a terminal according to the number of targets corresponding to the attribute of each target, wherein in the target set, when a target has a plurality of types of similar promotional information, one type of promotional information is generated based on the plurality of types of similar promotional information, in response that the promotional information is that N is deducted when a total purchase amount reaches M, generating one type of promotional information based on the plurality of types of similar promotional information comprises aggregating a plurality of "N is deducted when the total purchase amount reaches M" into "deduction from the total purchase amount"; and
    receiving the display target and the attribute of the display target,
    wherein determining the number of targets corresponding to an attribute of each target according to the attribute of each target in the target set comprises:
    calculating the number of occurrences of the attribute of each target in the target set;
    determining the number of targets corresponding to the attribute of each target according to the number of occurrences of the attribute of each target in the target set.

7. The method according to claim 6, wherein after receiving the display target and the attribute of the display target, the method further comprises:
    receiving an attribute of a display target designated by a user, to enable the server to respond to an operation of the user designating the attribute of the display target and send the display target corresponding to the attribute of the display target designated by the user to the terminal;
    receiving the display target corresponding to the attribute of the display target designated by the user.

8. An image-based search apparatus, applied to a server, the apparatus comprising:
    one or more processors; and
    a storage device for storing one or more programs,
    wherein, the processor is configured to:
    extract a target set from an index library according to an image content in an image, wherein each target in the target set has an attribute similar to the image content;
    determine the number of targets corresponding to an attribute of each target according to the attribute of each target in the target set; and
    send a display target and an attribute of the display target to a terminal according to the number of targets corresponding to the attribute of each target,
    wherein the processor is further configured to: in the target set, when a target has a plurality of types of similar promotional information, generate one type of promotional information based on the plurality of types of similar promotional information, in response that the promotional information is that N is deducted when a total purchase amount reaches M, generating one type of promotional information based on the plurality of types of similar promotional information comprises aggregating a plurality of "N is deducted when the total purchase amount reaches M" into "deduction from the total purchase amount",
wherein the processor is further configured to:
calculate the number of occurrences of the attribute of each target in the target set;
determine the number of targets corresponding to the attribute of each target according to the number of occurrences of the attribute of each target in the target set.

9. The apparatus according to claim 8, wherein the processor is further configured to:
search for targets similar to the image content from the index library according to the image content in the image;
extract the target set from the searched targets based on a principle of similarity.

10. The apparatus according to claim 8, wherein the processor is further configured to:
sort the attribute of each target according to the number of targets corresponding to the attribute of each target;
send the display target and the attribute of the display target to the terminal according to the sorting result.

11. The apparatus according to claim 10, wherein the processor is further configured to:
select the target attribute displayed to the terminal from the sorting result according to the number of display positions of the terminal;
send the target attribute and the display target corresponding to the target attribute to the terminal according to the target attribute displayed to the terminal.

12. The apparatus according to claim 8, wherein the processor is further configured to: send a display target corresponding to the attribute of the display target designated by a user to the terminal, in response to an operation of the user designating the attribute of the display target.

13. A terminal for searching for information, comprising:
an image sending apparatus, configured to send an image to a server, to enable the server to extract a target set from an index library according to an image content in an image, to determine the number of targets corresponding to an attribute of each target according to the attribute of each target in the target set, and send a display target and an attribute of the display target to a terminal according to the number of targets corresponding to the attribute of each target, wherein in the target set, when a target has a plurality of types of similar promotional information, one type of promotional information is generated based on the plurality of types of similar promotional information, in response that the promotional information is that N is deducted when a total purchase amount reaches M, generating one type of promotional information based on the plurality of types of similar promotional information comprises aggregating a plurality of "N is deducted when the total purchase amount reaches M" into "deduction from the total purchase amount";
a receiving apparatus, configured to receive the display target and the attribute of the display target; and
a displaying apparatus, configured to display the display target and the attribute of the display target,
wherein the image sending apparatus is further configured to:
calculate the number of occurrences of the attribute of each target in the target set;
determine the number of targets corresponding to the attribute of each target according to the number of occurrences of the attribute of each target in the target set.

14. The terminal according to claim 13, further comprising:
an input apparatus, configured to receive an attribute of a display target designated by a user and send the attribute of the display target designated by the user to the server, to enable the server to respond to an operation of the user designating the attribute of the display target and send the display target corresponding to the attribute of the display target designated by the user to the terminal,
wherein the receiving apparatus is further configured to receive the display target corresponding to the attribute of the display target designated by the user;
wherein the display apparatus is further configured to display the display target corresponding to the attribute of the display target designated by the user.

15. The terminal according to claim 13, further comprising:
an image acquiring apparatus, configured as an acquiring apparatus for acquiring an image.

16. The terminal according to claim 15, wherein the image acquiring apparatus comprises a camera installed on the terminal.

17. The terminal according to claim 13, wherein the display apparatus and the input apparatus are integrated as a touch-sensitive display apparatus, and the touch-sensitive display apparatus is configured to display the display target and the attribute of the display target, and input the attribute of the display target designated by the user.

18. A non-transitory computer-readable medium having executable instructions stored thereon, wherein the instructions enable a processor to execute the method according to claim 1 when executed by the processor.

19. A terminal, comprising:
one or more processors; and
a storage device for storing one or more programs,
wherein, the one or more programs enable one or more processors to execute the method according to claim 6 when executed by the one or more processors.

20. The terminal according to claim 19, comprising a camera configured to acquire an image.

21. The terminal according to claim 19, further comprising a touch-sensitive display configured to display the display target and the attribute of the display target, and input the attribute of the display target designated by the user.

22. A non-transitory computer-readable medium having executable instructions stored thereon, wherein the instructions enable a processor to execute the method according to claim 6 when executed by the processor.

* * * * *